Aug. 30, 1960  J. H. FRIES, JR  2,950,607
WATER HEATING AND COOLING SYSTEM
Filed Dec. 20, 1956
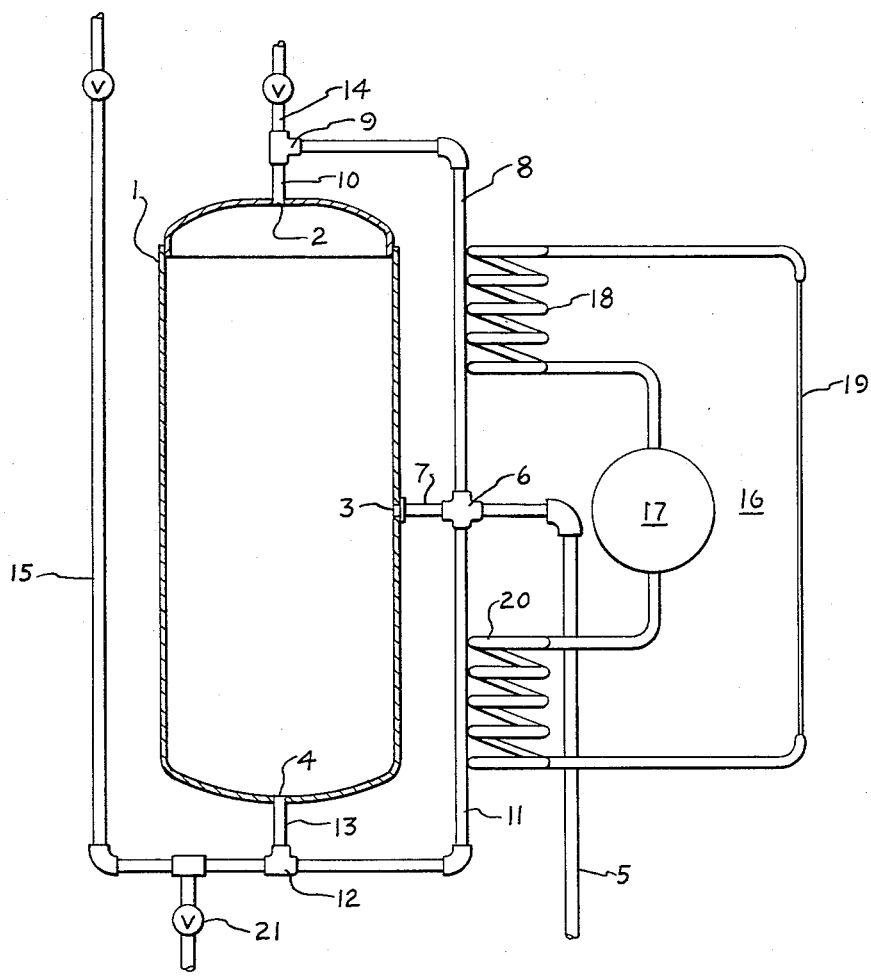
INVENTOR.
JOHN H. FRIES JR.
BY
HIS ATTORNEY

United States Patent Office 2,950,607
Patented Aug. 30, 1960

2,950,607

WATER HEATING AND COOLING SYSTEM

John H. Fries, Jr., Louisville, Ky., assignor to General Electric Company, a corporation of New York Filed Dec. 20, 1956, Ser. No. 629,577

5 Claims. (Cl. 62—324)

This invention relates to water heating and cooling systems, and has as its principal object the provision of a system of this type arranged to supply both hot and cold water from a single tank.

Another object of this invention is to provide a water heating and cooling system in which heat is transferred from a body of water circulating in the lower portion of a storage tank to another body of water circulating in the upper portion of the tank by means of a heat pump.

Further objects and advantages of this invention will become apparent as the following description proceeds, and the features of novelty which characterize the invention will be pointed out with particularity in the claims annexed to and forming part of this specification.

Briefly stated, in accordance with one aspect of the invention there is provided a water storage tank, a water supply line connected to the middle portion of the tank, hot and cold water discharge lines connected to the tank at the top and bottom thereof respectively, and a heat pump arranged to transfer heat from the water in the lower portion of the tank to the water in the upper portion of the tank.

For a better understanding of this invention reference may be made to the accompanying drawing in which the single figure is a diagrammatic view of a water heating and cooling system arranged in accordance with the present invention.

Referring to the drawing, the numeral 1 designates a water storage tank which preferably is surrounded by suitable insulation material and provided with suitable means for supporting it in an upright position (not shown). Tank 1 is provided with an opening 2 in the top wall thereof and opening 3 in the side wall thereof midway between the top and bottom of the tank, and an opening 4 in the bottom wall of the tank. The tank is supplied with water through a water supply line 5 which is connected to a four-way fitting 6 which in turn is connected to a pipe 7 communicating with side wall opening 3. The four-way fitting 6 is in open communication with the water supply line 5 and the tank 1 and enables water to be supplied continuously through line 5 so as to maintain the tank 1 in a full condition; subject of course, to periods of discharge wherein the tank may be substantially full.

In accordance with the present invention, water in the upper portion of the tank 1 is heated, water in the lower portion of the tank is chilled and water in the mid portion of the tank remains at approximately the temperature of the water in supply line 5, it being understood that layers of water at different temperatures tend to remain stratified when each layer is hotter than the layer below, and if left relatively undisturbed will not mix together. For the purpose of supplying heat to the water in the upper portion of tank 1, there is provided an external conduit system connecting opening 3 and opening 2, this conduit system including pipe 7, fitting 6, pipe 8 connected at its upper end to a T-fitting 9 and pipe 10 connecting T-fitting 9 to opening 2 in the tank. Similarly, an external conduit system is provided in the lower portion of the tank and includes a pipe 11 connected to fitting 6 at its upper end and to a T-fitting 12 at its lower end, and a pipe 13 connecting fitting 12 and opening 4 of the tank. Water may be discharged from the tank either through discharge line 14 which is connected by means of fitting 9 and pipe 10 to the upper portion of the tank, or by means of cold water line 15 which is connected by means of fitting 12 and pipe 13 to the lower portion of the tank.

The water in the upper portion of the tank is heated by the heat removed from water in the lower portion of the tank and transferred by means of heat pump 16 from the lower external conduit system including pipe 11 to the upper conduit system including pipe 8. Heat pump 16 includes a compressor 17, a condenser 18 in heat transfer relation with pipe 8, a restricting device such as a capillary tube 19, and an evaporator 20. Heat pump 16 will not be described in detail inasmuch as it may be of any suitable well-known design, it being understood that its function is to transfer heat from the water circulating by natural convection in pipe 11 to the water circulating by natural convection in pipe 8. It will be seen that as water in pipe 8 is heated it rises therein and returns through opening 2 to the upper portion of the tank, thus forcing a circulation in the upper tank portion through opening 3, pipe 7, fitting 6, pipe 8, fitting 9, pipe 10 and back through top opening 2. Similarly, it will be understood that as the water in the pipe 11 cools its increasing density results in a circulation of cold water through opening 3, pipe 7, fitting 6, pipe 11, fitting 12, pipe 13 and back into the tank through bottom opening 4.

From the foregoing it will be evident that hot water may be withdrawn from the tank through pipe 14 and that cold water may be withdrawn through outlet pipe 15, it having been pointed out above that the various layers of hot, cool and cold water in tank 1 remain stratified so that water at widely different temperatures may be withdrawn from the tank. If desired, heat pump 16 may be controlled by means of a thermostat responsive to the temperature in the upper portion of tank 1 so as to operate whenever the temperature falls below a predetermined value, or by a thermostat responsive to the temperature in the lower portion of tank 1, or by thermostats responsive to both temperatures. However, inasmuch as such control systems are well known in the art and form no part of the present invention, they are not described herein. It will also be understood that if large quantities of hot water are withdrawn from the tank during periods when small quantities of cold water are used, or if the temperature of the water supplied through inlet line 5 varies widely, it may be necessary to withdraw some of the cold water in the bottom of the tank in order to maintain a heat balance sufficient to provide sufficient heat to maintain the desired water temperature in the upper portion of the tank. For this purpose a blow down valve 21 may be connected in cold water line 15 and controlled either manually or in response to changes in the heat balance of the system.

Although side opening 3 in tank 1 is illustrated as being midway between the top and bottom of the tank so as to provide equal storage spaces for hot and cold water, it will be evident that the present invention is not limited to this arrangement. If desired, opening 3 may be located either closer to the top wall of the tank or closer to the bottom wall so as to provide various hot water versus cold water storage space ratios. Thus if the system is to be used primarily for the production of cold water, opening 3 may be located closer to the top of the tank than the bottom, while if the system is to be used primarily as a source of hot water (and the temperature of the water supplied through inlet line 5 is sufficiently high to supply the necessary heat) opening 3 may be located below the middle position shown in the drawing.

Furthermore, while in the illustrated embodiment of my invention I have employed a "side arm" type water heater, it will be understood that condenser 18 and evaporator 20 may be arranged in direct heat transfer relation with the water in tank 1. Thus, if desired, condenser 18 and evaporator 20 may be secured in heat transfer relation with external surfaces of tank 1 adjacent its top and bottom respectively, or they may be located inside of the tank in their relative positions. In such arrangements external conduits 8 and 11 are of course unnecessary and may be eliminated.

While I have shown and described a particular embodiment of my invention, I do not desire the invention to be limited to the particular construction disclosed, and I intend by the appended claims to cover all modifications within the true spirit and scope of my invention.

What I claim is:

1. A water heating and cooling system comprising a single water storage tank, a water inlet line connected to an opening in a side wall of the tank, and a heat pump including a condenser in heat transfer relation with hot water stored in the upper portion of said tank above said opening and an evaporator in heat transfer relation with cold water stored in the lower portion of said tank below said opening, the evaporator serving to extract the heat from the inlet water at supply line temperature being delivered to the cold water circulating in the bottom of the tank, said condenser serving to add heat to the inlet water at supply line temperature being delivered to the hot water circulating in the top of the tank, the water introduced through the water inlet line being warmer than the cold water in the bottom and colder than the hot water in the top to provide the stratified storage of water at three separate temperatures.

2. A water heating and cooling system comprising a single water storage tank, a water inlet line connected to an opening in a side wall of said tank substantially midway between the top and bottom walls thereof, and a heat pump including a condenser arranged to supply heat to the water in the upper portion of said tank above said opening and an evaporator arranged to cool water in the lower portion of said tank below said opening, the evaporator serving to extract the heat from the inlet water at supply line temperature being delivered to the cold water circulating in the bottom of the tank, said condenser serving to add heat to the inlet water at supply line temperature being delivered to the hot water circulating in the top of the tank, the water introduced through the water inlet line being warmer than the cold water in the bottom and colder han the hot water in the top to provide the stratified storage of water at three separate temperatures.

3. A water heating and cooling system comprising a water storage tank, a first conduit connected at one end to an opening in the top wall of the tank and at its other end to an opening in a side wall of the tank so as to complete a first water circulation path including the upper portion of the tank, a second conduit connected at one end to an opening in the bottom wall of the tank and at its other end to an opening in a side wall of the tank so as to complete a second water circulation path including the lower portion of the tank, a water inlet line connected to an opening in a side wall of the tank, and a heat pump including a condenser in heat transfer relation with said first conduit and an evaporator in heat transfer relation with said second conduit.

4. A water heating and cooling system comprising a water storage tank, a first conduit connected at one end to an opening in the top wall of the tank and at its other end to an opening in a side wall of the tank so as to complete a first water circulation path including the upper portion of the tank, a second conduit connected at one end to an opening in the bottom wall of the tank and at its other end to said side wall opening so as to complete a second water circulation path including the lower portion of the tank, a water inlet line connected to an opening in a side wall of the tank, and a heat pump including a condenser in heat transfer relation with said first conduit and an evaporator in heat transfer relation with said second conduit.

5. A water heating and cooling system comprising a water storage tank, a first conduit connected at one end to an opening in the top wall of the tank and at its other end to an opening in a side wall of the tank substantially midway between the top and bottom thereof, a second conduit connected at one end to an opening in the bottom wall of the tank and at its other end to said side wall opening, a water inlet line connected to said side wall opening, a heat pump including a condenser in heat transfer relation with said first conduit and an evaporator in heat transfer relation with said second conduit, a hot water outlet line connected to said top wall opening, and a cold water outlet connected to said bottom wall opening.

References Cited in the file of this patent
UNITED STATES PATENTS

| | | |
|---|---|---|
| 1,969,187 | Schutt | Aug. 7, 1934 |
| 2,125,842 | Eggleston | Aug. 2, 1938 |
| 2,751,761 | Borgerd | June 26, 1956 |
| 2,767,960 | Fast | Oct. 23, 1956 |